United States Patent
Weskamp et al.

(10) Patent No.: US 6,755,295 B2
(45) Date of Patent: *Jun. 29, 2004

(54) AUTOMATIC CHAIN TRACK LUBRICATOR

(75) Inventors: Robert J. Weskamp, Long Grove, IL (US); James A. Morbeck, Cary, IL (US)

(73) Assignee: Wes-Tech, Inc., Buffalo Grove, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 138 days.

(21) Appl. No.: 09/320,149

(22) Filed: May 26, 1999

(65) Prior Publication Data

US 2002/0017446 A1 Feb. 14, 2002

(51) Int. Cl.$^7$ ............................................. B65G 45/08
(52) U.S. Cl. ...................... 194/500; 184/15.1; 184/16; 474/91
(58) Field of Search ..................... 198/500; 184/15.1, 184/16; 474/91

(56) References Cited

U.S. PATENT DOCUMENTS

| | | | | |
|---|---|---|---|---|
| 3,981,666 A | * | 9/1976 | Wadman .................... 425/371 |
| 4,023,648 A | * | 5/1977 | Orlitzky et al. ............. 222/389 |
| 4,226,325 A | * | 10/1980 | Vandas ....................... 198/493 |
| 4,262,776 A | * | 4/1981 | Wilson et al. .............. 184/15.1 |
| 4,271,930 A | * | 6/1981 | Thomson et al. .......... 184/15.2 |
| 4,274,509 A | * | 6/1981 | Thomson et al. .......... 184/15.3 |
| 4,346,801 A | * | 8/1982 | Redder et al. ............. 198/500 |
| 4,482,430 A | * | 11/1984 | Majaniemi ................ 162/358.4 |
| 4,566,560 A | * | 1/1986 | Elliott et al. ............... 184/15.1 |
| 4,655,432 A | * | 4/1987 | Woodruff ............ 254/134.3 FT |
| 4,926,971 A | * | 5/1990 | Egger ......................... 184/15.1 |
| 5,320,132 A | * | 6/1994 | Weisse ........................ 137/597 |
| 5,433,679 A | * | 7/1995 | Szymczak et al. ............ 482/54 |
| 5,626,470 A | * | 5/1997 | Gerhardt ....................... 418/84 |

FOREIGN PATENT DOCUMENTS

| | | | |
|---|---|---|---|
| EP | 0049598 A1 | * | 9/1981 |
| EP | 0324332 A2 | * | 12/1988 |
| EP | 0470900 A1 | * | 8/1991 |
| JP | 54-151283 | * | 5/1978 |

* cited by examiner

Primary Examiner—Donald P. Walsh
Assistant Examiner—Jeffery A Shapiro
(74) Attorney, Agent, or Firm—Baker & McKenzie; David I. Roche

(57) ABSTRACT

A conveyor system having an automatic lubricating system for the conveyor chain and its associated guide track is provided. The conveyor system includes a conveyor chain, a guide track, a lubricator, and a support frame. The guide track is carried by the support frame, and has a bottom wall with a guide surface and an aperture. The conveyor chain has interconnecting links, and is supported by the guide track for movement. Each of the links of the conveyor chain has a lower surface that may contact the guide surface of the guide track when the conveyor chain is moved. The lubricator is mounted on the support frame, and includes a separator dividing the lubricator into a lubricant chamber and a gas compartment. The lubricator includes an electrochemical cell in the gas compartment for generating gas that flows against the separator to move the separator against the lubricant in the chamber to force the lubricant through an outlet. An adapter block and piping are used to place the lubricator outlet in fluid communication with the aperture in the bottom wall of the guide track. When the lubricator is activated, lubricant exits the lubricator, and travels through the adapter block and the aperture in the bottom wall of the guide track. When the links pass over areas near the aperture, the lower surfaces of the links contact the lubricant and a lubricating film is formed between guide surface of the guide track and the lower surface of each link.

14 Claims, 4 Drawing Sheets

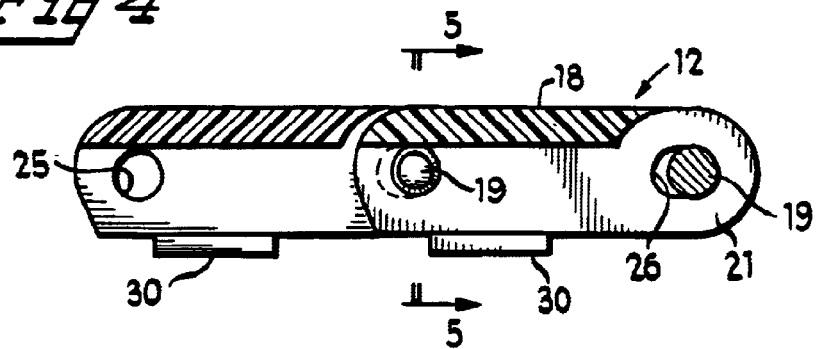
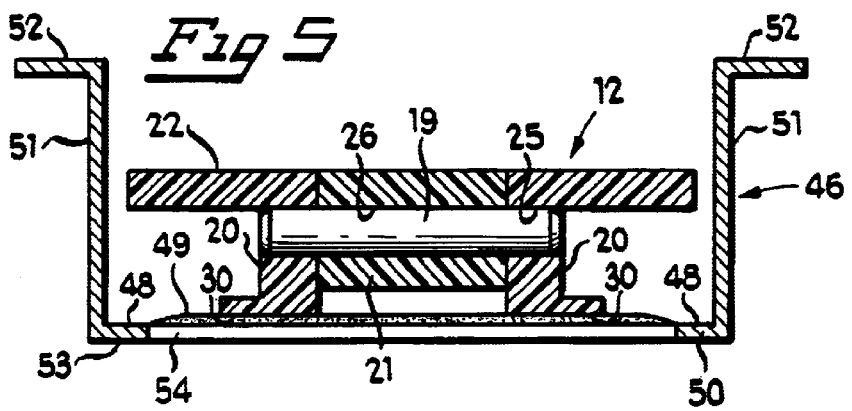
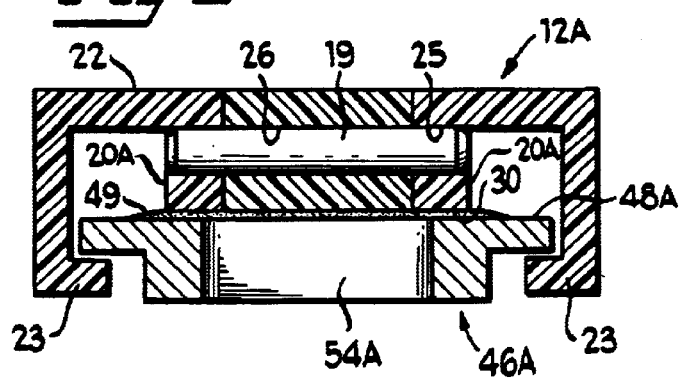
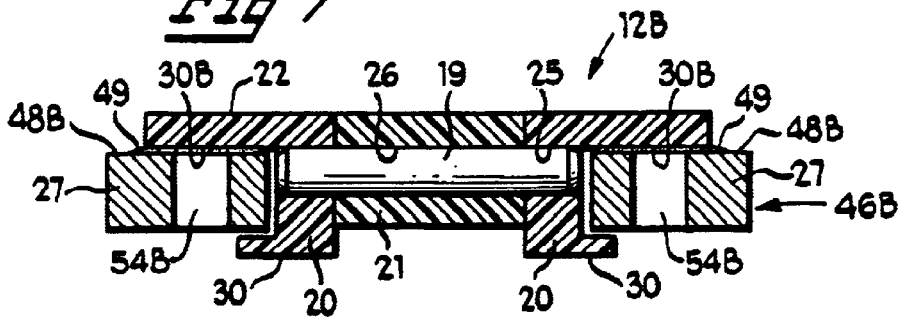

AUTOMATIC CHAIN TRACK LUBRICATOR

BACKGROUND OF THE INVENTION

1. Field of the Invention

The present invention relates to lubricating systems for conveying equipment, and more particularly to an automatic lubricator for a conveyor system that includes a conveyor chain and an associated conveyor chain track.

2. Description of the Related Art

Different types of automated conveying systems are known in the art. One type of known conveying system comprises a plurality of interconnected links which run along appropriate guides. U.S. Pat. Nos. 4,436,200 and 5,586,644 show examples of this type of conveying system.

In order for these types of conveying systems to run as smoothly as possible, the friction between the lower surfaces of the interconnected links and the guide surfaces must be minimized. Also, the friction between the lower surfaces of the interconnected links and the guide surfaces must be minimized in order to reduce wear in the links and the guide.

Various methods have been proposed for limiting the friction between the lower surfaces of the interconnected links and the guide. For instance, manual application of a lubricant to the guide surfaces and the links has always been a possible, though labor-intensive, option to minimize friction. As an alternative to manual lubrication, certain conveying systems have used links or guides made from special materials that have minimal surface roughness and are wear resistant. As another alternative to manual lubrication methods, many operators of conveyor systems have used various devices for automatically applying lubricating fluid to the links of a conveyor chain. For example, U.S. Pat. Nos. 3,785,456, 3,869,023, 4,085,821 and 4,368,803 disclose automatic devices for dispensing lubricating fluids to a conveyor system or a conveyor chain. A more recent solution to the problem of lubricating a conveyor chain and its associated guides can be found in U.S. Pat. No. 5,779,027, which discloses the use of lubrication inserts that form a lubricating film between the links of a conveyor chain and the surface of the guides that direct the conveyor chain.

Most known automatic conveyor lubricating systems, including many of the systems mentioned above, require the use of some type of detecting device that initiates a lubrication cycle when tripped by a portion of the conveyor chain. Often, an installer of this type of conveyor lubrication system must secure a detector or a mechanical trip to the conveyor chain, and also relocate electrical, hydraulic or pneumatic lines in order to supply a source of power to the lubricating system. Depending on the complexity of the lubricating system, the installation and maintenance costs of the lubricating system may actually exceed the cost of periodically manually lubricating the conveyor chain and conveyor chain guide. As a result, the users of conveying systems may not opt for automatic lubrication devices as the benefits of automatic lubrication are outweighed by installation and maintenance costs.

Therefore, in view of the cost and complexity of existing automatic conveyor chain lubricators, there is a continuing need for conveyor systems having alternative automatic lubricators for the conveyor chain and its associated conveyor chain track.

It is therefore an object of the present invention to provide a conveying system with an automatic conveyor chain and conveyor chain track lubricating system that provides an alternative to manual lubrication methods and to the use of conveyor chain links or guides made from special materials.

It is still another object of the present invention to provide conveying system with an automatic conveyor chain and conveyor chain track lubricating system that may be operated without attention and maintenance.

It is yet another object of the present invention to provide a conveying system having an automatic conveyor chain and conveyor chain track lubricating system that may be operated without the need for conveyor chain detecting devices that trigger a lubrication cycle.

It is still another object of the present invention to provide an automatic conveyor chain and conveyor chain track lubricating system that may be easily installed at virtually any location along the length of the conveyer chain guide track thereby providing maximum flexibility in the placement of the lubricating system.

It is a further object of the present invention to provide an automatic conveyor chain and conveyor chain track lubricating system that may be easily installed at virtually any location along the length of the conveyer chain guide track without the need to supply electrical, pneumatic or hydraulic lines to the lubricator.

SUMMARY OF THE INVENTION

The foregoing needs are satisfied and the foregoing objects achieved by a conveyor system that comprises an endless conveyor chain, a guide track, a lubricator, and a support frame. The guide track is carried by the support frame, and has a bottom wall and opposed sidewalls that extend upward from the bottom wall. The bottom wall of the guide track has a guide surface and an aperture. The conveyor chain is comprised of interconnecting links, and is supported by the guide track for movement within the guide track. Each of the interconnected links of the conveyor chain has a lower surface that may contact the guide surface of the guide track when the conveyor chain is moved by a drive motor and sprocket. The lubricator is mounted on the support frame, and includes a separator dividing the lubricator into a chamber for storing lubricant and a gas compartment. The separator is movably mounted in the lubricator spaced from and movable towards an outlet of the lubricant chamber. The lubricator includes an electrochemical cell in the gas compartment for generating gas when the cell is connected to a source of electric current such as a battery. The gas flows into the gas compartment and against the separator to move the separator against the lubricant in the chamber to force the lubricant out through the outlet. One type of lubricator having these features is shown in U.S. Pat. Nos. 4,023,648 and 4,671,386.

An adapter block and piping are typically used to place the outlet of the lubricator in fluid communication with the aperture in the bottom wall of the guide track. First, the adapter block is assembled to the bottom surface of the guide track. The adapter block has ports in fluid communication with an opening in a projection that extends outward from the adapter block. When the adapter block is assembled to the guide track, the projection fits into the aperture in the bottom wall of the guide track. After the adapter block is assembled to the guide track, a fluid path between the lubricator and a port of the adapter block is constructed by way of piping. As a result, a fluid path between the outlet of the lubricator and the aperture in the bottom wall of the guide track is established.

In operation of the conveyor system, the drive motor and sprocket pull the conveyor chain relative to the guide track such that the conveyor chain traverses the guide track. Movement of the conveyor chain in the guide track causes frictional forces between the guide surface of the guide track and the lower surface of each link that contacts the guide surface. In order to allow the conveyor chain to run smoothly in the guide track and also minimize wear of the lower surface of each link and the guide surface, the lubricator is activated to automatically supply lubricant to the guide track and links. Lubricant exits the lubricator, and travels through the adapter block and the opening in the projection of the adapter block. Lubricant moves through the aperture in the bottom wall of the guide track, and covers areas of the guide surface near the aperture. When the links pass over areas of the guide surface near the aperture, the lower surfaces of the links contact the lubricant and a lubricating film is formed between the guide surface of the guide track and the lower surface of each link that contacts the guide surface of the guide track.

The lubricating film minimizes frictional forces between the guide surface and the lower surface of each link and thereby allows the conveyor chain to run smoothly in the guide track and also minimizes wear of the lower surface of each link and the guide surface of the guide track. Because the lubricator operates continuously, the links and guide surface of the guide track are kept well lubricated without the need for maintenance personnel to lubricate the chain and guide track by hand. Also, there is no need for the relocation of pneumatic, hydraulic or electrical lines as the lubricator operates as self-contained unit within the conveyor system.

DESCRIPTION OF THE DRAWINGS

These and other features, aspects, object and advantages of the present invention will become better understood upon consideration of the following detailed description, appended claims and accompanying drawing where:

FIG. 4 is a side elevation view of several links of one type of conveyor chain in accordance with the present invention;

FIG. 5 is a vertical sectional view through the links of FIG. 4 on line 5—5 and a vertical sectional view through the guide track of the conveyor system of FIG. 2 on line 5—5;

FIG. 6 is a vertical sectional view through another version of the links and the guide track, the view being similar to FIG. 5;

FIG. 7 is a vertical sectional view through still another version of the links and the guide track, the view being similar to FIG. 5;

Figure 1:
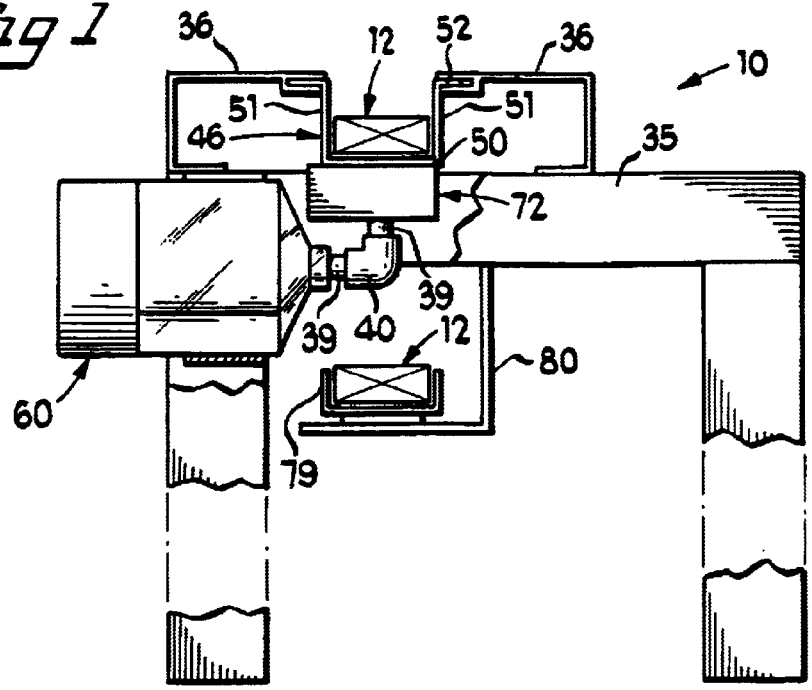
FIG. 1 is an end elevation view of a section of a conveyor system in accordance with the present invention.

It should be understood that the drawings are not necessarily to scale and that the embodiments are sometimes illustrated by graphic symbols, phantom lines, diagrammatic representations and fragmentary views. In certain instances, details that are not necessary for understanding the invention or which make other details difficult to perceive may have been omitted. It should be understood, of course, that the invention is not necessarily limited to the particular embodiments illustrated herein.

Like reference numerals will be used to refer to like parts throughout the Figures.

DETAILED DESCRIPTION OF THE INVENTION

Figure 2:
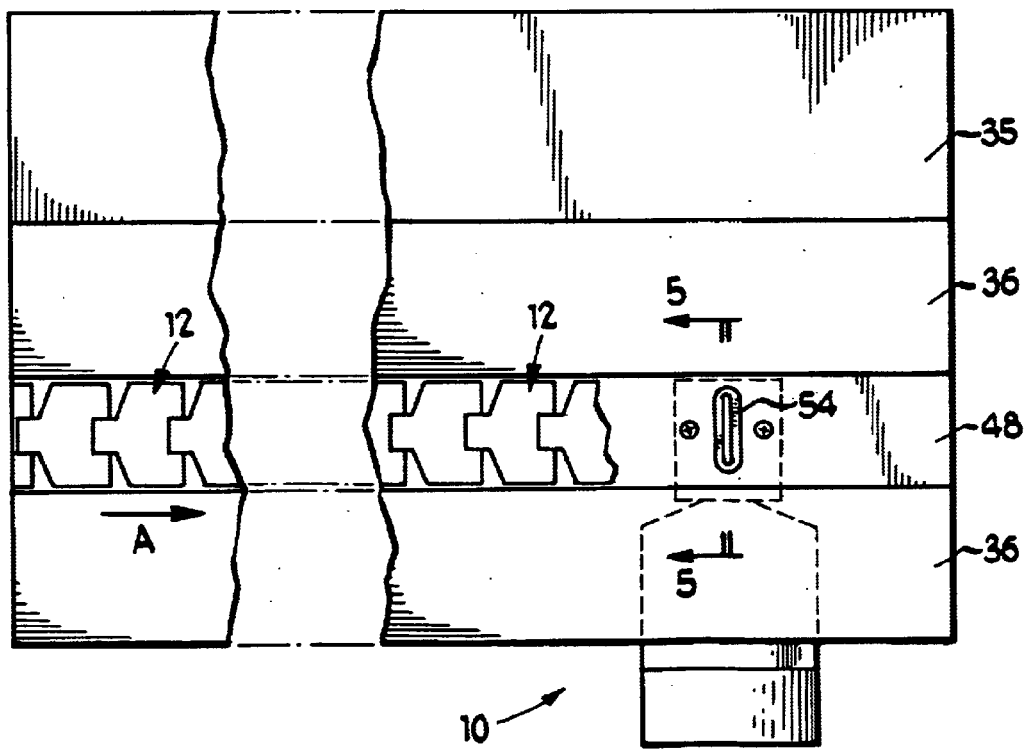
FIG. 2 is a top plan view of a section of a conveyor system in accordance with the present invention.
Figure 3:
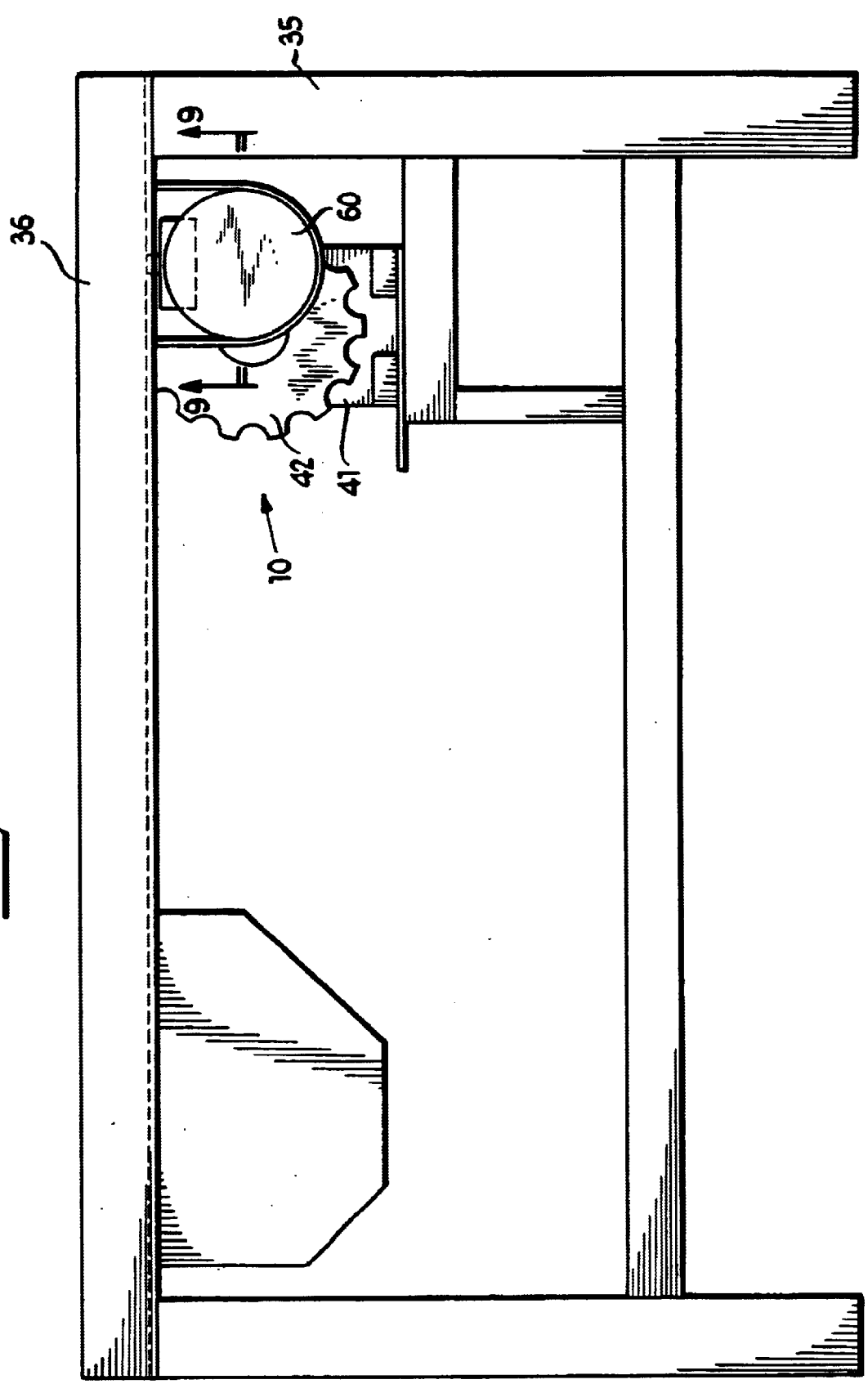
FIG. 3 is side elevation view of a section of a conveyor system in accordance with the present invention.

Referring now to FIGS. 1–3, there is shown a section of a conveyor system 10 in accordance with the present invention. The conveyor system 10 broadly comprises an endless conveyor chain 12, a guide track 46, a lubricator 60 and a support frame 35. The lubricator 60 is attached to the support frame 35 by conventional means, and the guide track 46 is attached to the support frame 35 by way of mounting brackets 36.

The conveyor chain 12 is supported by the guide track 46 for movement relative to the guide track 46. The conveyor chain 12 in the version of the invention shown in FIGS. 1–3 is moved in direction 'A' shown in FIG. 2 by way of a sprocket 42 and a drive motor 41 shown in FIG. 3. The sprocket 42 and drive motor 41 are conventional drive means known in the art. The lower inverted return run of the conveyor chain 12 is supported in return run guide channel 79 which is attached to the support frame 35 by way of an L-shaped bracket 80 as shown in FIG. 1.

Turning now to FIGS. 4 and 5, it can be seen that the conveyor chain 12 of the version of the invention shown in FIGS. 1–3 includes molded links 18 and connecting pins 19. Each link 18 is of integral molded construction and includes two side members 20, a cross-member 21 which joins the trailing ends of side members 20, and a top plate 22 which lies on top of the cross-member 21 and side members 20. The side members 20 of the link 18 have a lower surface 30 that contacts the guide track 46 when the conveyor chain 12 is moved within the guide track 46. Each link 18 may be molded of a plastic material having the necessary tensile strength, dimensional and chemical stability. For example, acetal resins have been used for the links. Each link 18 is arranged so that its rear end fits between two forward ends of the following link whereby each two adjacent links may be connected by a connecting pin 19. The connecting pin 19 fits in a bore 26 of the cross-member 21 of each link 18 and the ends of the connecting pin 19 are secured in aligned bores 25 of the forward ends of the following link.

The guide track 46 used in the version of the invention shown in FIGS. 1–3 is shown in greater detail in FIG. 5. The guide track 46 includes a bottom wall 50 and opposed sidewalls 51 which extend upward from the bottom wall 50. Flanges 52 are provided at the uppermost end of the sidewalls 51 to assist in assembling the guide track 46 in the mounting brackets 36 as shown in FIG. 1. The bottom wall 50 of the guide track 46 has a guide surface 48 and an oblong aperture 54, as shown in FIG. 2.

Figure 9:
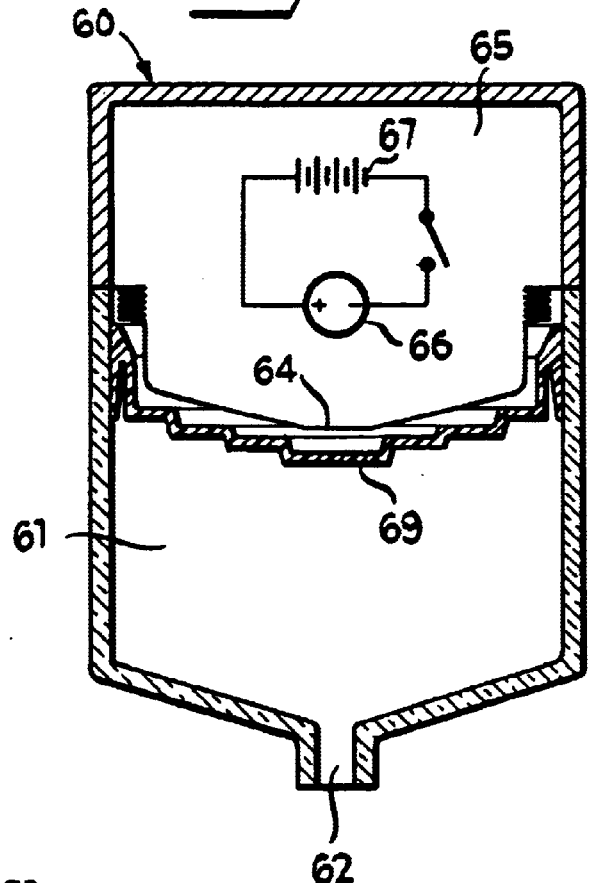
FIG. 9 is a sectional view of a lubricator in accordance with the present invention taken along line 9—9 of FIG. 3.

A lubricating apparatus suitable for use in the present invention is shown in FIG. 9. The lubricator 60 broadly comprises a chamber 61 for lubricant, a gas compartment 65 and a separator 64. It can be seen from FIG. 9 that the separator 64 of the lubricator 60 separates the lubricator 60 into the lubricant chamber 61 and the gas compartment 65.

In the gas compartment 65 of the lubricator 60, there is a gas generating device to generate gas to develop pressure. These means are well known and may, for example, comprise an electrochemical cell or reaction chamber 66 having an anode and a cathode. A battery 67 is provided to supply voltage across the anode and the cathode. The electrochemical cell or reaction chamber 66 may contain any chemical composition that, upon the application of a voltage, generates the gas. One such reaction chamber is described in U.S. Pat. No. 4,023,648.

The separator 64 of the lubricator 60 is responsive to the pressure generated by the gas and serves to force lubricant from the chamber 61 through an outlet 62. The separator 64 may be a diaphragm or bellows made of a material such as a polyamide that enables expansion and contraction of the separator 64. A piston 69 is also located in the lubricant chamber 61. During operation of the lubricator 60, the separator 64 expands on the generation of gas to push against piston 69 which is a gastight slidable fit within the chamber 61. The piston 69 thereby forces lubricant from the chamber 61 through outlet 62. Suitable lubricants include petroleum-based oils, greases and lubricants, vegetable oils, and synthetic lubricants and greases. A preferred lubricant for use in accordance with the present invention is a grease sold by Texaco under the trademark "STARPLEX"#2.

Figure 8A:
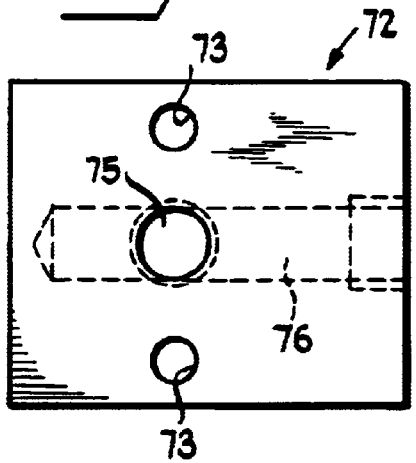
FIG. 8A is a bottom plan view of an adapter block in accordance with the present invention.
Figure 8B:
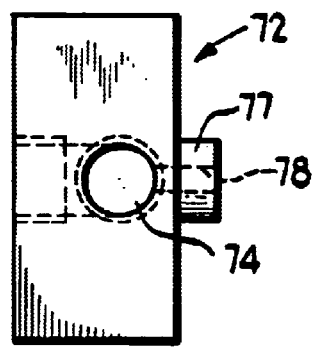
FIG. 8B is a side elevation view of the adapter block of FIG. 8A.
Figure 8C:
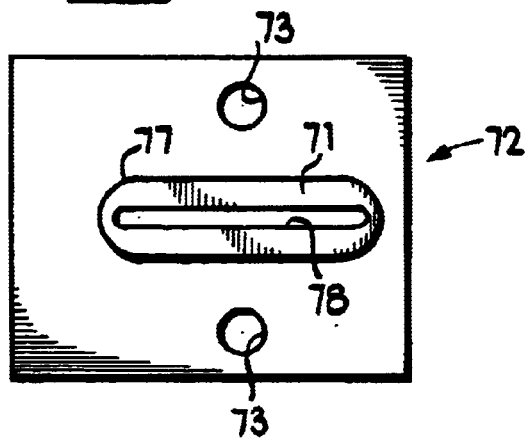
FIG. 8C is a top plan view of the adapter block of FIGS. 8A and 8B.

In the version of the invention shown in FIGS. 1–3, an adapter block 72, tubular pipes 39 and an elbow joint 40 are used to place the lubricator 60 in fluid communication with the aperture 54 in the bottom wall 50 of the guide track 46. First, the adapter block 72 is assembled to the bottom surface 53 of the guide track 46. As can be seen from FIGS. 8A–8C, the adapter block 72 is a generally rectangular solid block, and is preferably fabricated from aluminum. The adapter block 72 has holes 73 with internal threads that enable the adapter block 72 to be secured to the bottom surface 53 of the guide track 46 with screws 38 shown in FIG. 2. Countersunk holes are used in the bottom wall 50 of the guide track 46 so that the heads of the screws 38 are flush with the guide surface 48 of the guide track 46 when the adapter block 72 is secured to the guide track 46.

The adapter block 72 has a side port 74 with internal threads and a bottom port 75 with internal threads. The side port 74 and the bottom port 75 are both in communication with an internal passageway 76. The top of the adapter block 72 has an oblong raised area or projection 77 that extends outward from the adapter block 72 and acts as a nozzle. The oblong projection 77 has an upper flat surface 71 and an oblong opening or slot 78 that is in communication with the internal passageway 76. Accordingly, fluid that enters either the side port 74 or bottom port 75 can pass through the internal passageway 76 and out of the projection 77 through the oblong opening 78. In the version of the invention shown in FIGS. 1–3, the aperture 54 in the bottom wall 50 of the guide track 46 is an oblong aperture that has a perimeter dimensioned virtually identical to the perimeter of the oblong projection 77 of the adapter block 72. As a result, when the adapter block 72 is assembled to the guide track 46, the projection 77 of the adapter block 72 fits snugly into the aperture 54 in the bottom wall 50 of the guide track 46. Preferably, the upper flat surface 71 of the projection 77 of the adapter block 72 is flush with the guide surface 48 of the guide track 46 when the adapter block 72 is assembled to the guide track 46.

After the adapter block 72 is assembled to the guide track 46, the fluid path between the lubricator 60 and the adapter block 72 is constructed by way of the tubular pipes 39 and elbow joint 40. This construction is by known means such as a combination of internal threads in the end sections of the elbow joint 40 and external threads on the end sections of the tubular pipes 39. Accordingly, a fluid path between the outlet 62 of the lubricator 60 and the aperture 54 in the bottom wall 50 of the guide track 46 is established. The adapter block 72 includes both a side port 74 and a bottom port 75 so that a fluid path may be established between the lubricator 60 and either the side port 74 or the bottom port 75. This allows easier retrofit of existing conveyor systems in that the most efficient piping configuration between the lubricator 60 and the adapter block 72 may be selected. After the fluid path is established to either the side port 74 or the bottom port 75, the remaining open port may be sealed with a threaded plug (not shown).

In operation of the conveyor system 10, the drive motor 41 and sprocket 42 pull the conveyor chain 12 relative to the guide track 46 such that the conveyor chain 40 traverses the guide track 46. As the links 18 of the conveyor chain 12 move over the guide track 46, the lower surface 30 of each link 18 may contact the guide surface 48 of the guide track 46 at different times during operation of the conveyor system 10. In any event, the lower surface 30 of at least one link 18 contacts the guide surface 48 of the guide track 46 during operation of the conveyor system 10. Movement of the conveyor chain 12 in the guide track 46 causes frictional forces between the guide surface 48 of the guide track 46 and the lower surface 30 of each link 18 that contacts the guide surface 48. In order to allow the conveyor chain 12 to run smoothly in the guide track 46 and also minimize wear of the lower surface 30 of each link 18 and the guide surface 48 of the guide track 46, the lubricator 60 is activated to supply lubricant to the guide track 46 and links 18.

Specifically, the battery 67 is connected to the electrochemical cell 66 in order to force lubricant out of the lubricator 60 and through the fluid path to the adapter block 72. The lubricant exits the opening 78 in the projection 77 of the adapter block 72 and covers the upper flat surface 71 of the projection 77 and areas of the guide surface 48 near the upper flat surface 71 of the projection 77 of the adapter block 72. When the links 18 pass over the upper flat surface 71 of the projection 77 and areas of the guide surface 48 near the upper flat surface 71 of the projection 77, the lower surfaces 30 of the links 18 contact the lubricant and a lubricating film 49 as shown in FIGS. 5–7 is formed between guide surface 48 of the guide track 46 and the lower surface 30 of each link 18 that contacts the guide surface 48 of the guide track 46. The lubricating film 49 minimizes frictional forces between the guide surface 48 and the lower surface 30 of each link 18 and thereby allows the conveyor chain 12 to run smoothly in the guide track 46 and also minimizes wear of the lower surface 30 of each link 18 and the guide surface 48 of the guide track 46. Because the lubricator 60 operates continuously, the links 18 and guide surface 48 of the guide track 46 are kept well lubricated without the need for maintenance personnel to lubricate the chain 12 and guide track 46 by hand. Also, there is no need for lubrication systems that require the relocation of pneumatic, hydraulic or electrical lines as the lubricator 60 operates as self-contained unit within the conveyor system 10. After all of the lubricant passes out of the lubricator 60, the lubricator 60 is merely replaced with a new unit and the new lubricator 60 is activated for continuous use until another lubricator 60 is required.

It has been discovered that certain configurations of the aperture 54 in the guide track 46 and the projection 77 of the adapter block 72 provide enhanced lubrication to the guide track 46 and the lower surfaces 30 of the links 18. Specifically, it is preferred that the aperture 54 in the guide track 46 be an oblong aperture having its elongated dimension arranged substantially transverse to a direction of movement of the conveyor chain 12. Typically, this means that the aperture 54 creates an angle of 45 degrees or less with a line perpendicular to the direction of movement of the conveyor chain 12. Also, it is preferred that the oblong aperture 54 in the guide track 46 extend from a first location adjacent one of the opposed sidewalls 51 of the guide track 46 to a second location adjacent the other opposed sidewall 51 of the guide track 46. This configuration can be best seen in FIGS. 2 and 5. These configurations of the aperture 54 provide for uniform lubrication across the width of the guide surface 48 of the guide track 46 and the width of the lower surfaces 30 of the links 18. It is also preferred that the adapter block 72 and the aperture 54 of the guide track 46 be arranged such that upper flat surface 71 of the projection 77 of the adapter block 72 is flush with the guide surface 48 of the guide track 46. This serves to minimize any areas of misalignment between the edges of the projection 77 and the aperture 54 of the guide track 46 that could mar or nick the links 18 of the conveyor chain 12 when the conveyor chain 12 is moved over the guide track 46. These preferred configurations of the aperture in the guide track and the projection of the adapter block are also advantageous when used with other versions of the conveyor chain and the guide track, such as those described below.

The automatic lubrication system of the present invention may be installed in an unlimited number of locations in a new or existing conveyor system. First, a section of the bottom wall 50 of the guide track 46 is removed in order to form the aperture 54 in the bottom wall 50. The adapter block 72 is then assembled to the guide track 46, as described above, with the projection 77 of the adapter block 72 fitting into the aperture 54 in the bottom wall 50 of the guide track 46. The lubricator 60 is assembled to the support frame 35, and tubular pipes 39 and elbow joint 40 are used to place the lubricator 60 in fluid communication with the adapter block 72. The lubricator 60 is then activated and automatic lubrication begins. It can be appreciated that a conveyor system may also include numerous lubricators 60 at different locations in the conveyor system.

Turning now to FIG. 6, first alternative versions of the conveyor chain 12A and the guide track 46A are shown. In this version of the invention, the guide track 46A has an almost T-shaped cross-section and includes an oblong aperture 54A and a guide surface 48A. The conveyor chain 12A has side members 20A that extend downward below the guide track 46A and terminate in inwardly directed flanges 23 that serve to keep the conveyor chain 12A from "jumping" off of the guide track 46A. In this version of the invention, the adapter block 72 is assembled to the bottom of the guide track 46A in the same manner as above, that is, the adapter block 72 is assembled to the guide track 46A so that the projection 77 of the adapter block 72 fits into the aperture 54A of the guide track 46A. The lubricator 60 is then placed in fluid communication with the adapter block 72 as described above. The lubricator 60 is activated and lubricant flows to the guide surface 48A thereby forming a lubricating film 49 between the guide surface 48A of the guide track 46A and the lower surface 30 of each link 18 that contacts the guide surface 48A of the guide track 46A.

Referring now to FIG. 7, second alternative versions of the conveyor chain 12B and the guide track 46B are shown. In this version of the invention, the guide track 46B comprises a pair of spaced apart guide rails 27. Each guide rail 27 includes an oblong aperture 54B and a guide surface 48B. The conveyor chain 12B is identical to the preferred conveyor chain 12 described above. In this version of the invention, an adapter block 72 is assembled to the bottom of each guide rail 27 in the same manner as above, that is, the adapter block 72 is assembled to the guide rail 27 so that the projection 77 of the adapter block 72 fits into the aperture 54B of the guide rail 27. A separate lubricator 60 is then placed in fluid communication with each adapter block 72 using piping as described above. Each lubricator 60 is then activated and lubricant flows to the guide surface 48B of each guide rail 27 thereby forming a lubricating film 49 between the guide surface 48B of each guide rail 27 and the lower surface 30B of each link 18 that contacts the guide surface 48B of each guide rail 27.

Thus, it is seen that an improved conveyor system having an automatic lubricator for the conveyor chain and its associated guide track is provided. The invention provides an alternative to systems requiring manual lubrication and to systems using conveyor chain links or guides made from special materials. The lubricator of the conveyor system may be operated without attention and without the need for devices that trigger a lubrication cycle. The lubricator of the invention may also be easily installed at virtually any location along the length of the conveyer chain guide track without the need to supply electrical, pneumatic or hydraulic lines to the lubricator.

Although the invention has been described in considerable detail with reference to certain preferred embodiments, one skilled in the art will appreciate that the present invention can be practiced by other than the preferred embodiments, which have been presented for the purpose of illustration and not of limitation. Therefore, the spirit and scope of the appended claims should not be limited to the description of the preferred embodiments illustrated herein.

What is claimed is:

1. A conveyor system comprising:
    a guide track having a guide surface and an aperture;
    a conveyor chain supported by the guide track for movement relative to the guide track, the conveyor chain including a plurality of interconnected links, a lower surface of at least one link contacting the guide surface of the guide track when the conveyor chain is moved by a drive means; and
    a lubricator including a chamber for storing a lubricant and means for forcing lubricant from the chamber through an outlet in the chamber, the outlet of the chamber being in fluid communication with the aperture in the guide track, the means for forcing lubricant from the chamber continuously forcing lubricant from the chamber and through the aperture in the guide track when the means for forcing lubricant from the chamber is connected to a source of electric current contained within the lubricator,
    the outlet of the lubricator and the aperture in the guide track being connected in fluid communication by a conduit and an adapter block, the conduit being connected to the outlet of the lubricator and a port in the adapter block, said port being oblong and presenting a single stream of outwardly flowing lubricant, and said port having a longitudinal axis transverse to the direction of said movement of said chain, the adapter block being connected to the aperture in the guide track, the adapter block having a projection dimensioned to fit into the aperture in the guide track and having a passageway extending from the port to an opening in the projection whereby lubricant is forced from the chamber through the conduit and out of the opening in the projection in the adapter block,
    whereby a lubricating film is continuously formed between the guide surface of the guide track and the lower surface of each link that contacts the guide surface of the guide track when the means for forcing lubricant from the chamber is connected to the source of electric current.

2. The conveyor system of claim 1 wherein:

the guide track has a bottom wall and opposed sidewalls extending upward from the bottom wall, the bottom wall including the guide surface and the aperture.

3. The conveyor system of claim 2 wherein:

the aperture in the bottom wall of the guide track is an oblong aperture having its elongated dimension arranged substantially transverse to a direction of movement of the chain and the projection of the adapter block fits snugly in the aperture.

4. The conveyor system of claim 3 wherein:

the aperture in the bottom wall of the guide track extends from a first location adjacent one of the opposed sidewalls of the guide track to a second location adjacent the other opposed sidewall of the guide track.

5. The conveyor system of claim 4 wherein:

the projection of the adapter block has an upper flat surface that is flush with the guide surface.

6. The conveyor system of claim 5 wherein:

the means for forcing lubricant from the chamber comprises
   a separator dividing the lubricator into the chamber for storing lubricant and a gas compartment, the separator being movably mounted in the lubricator spaced from and movable towards the outlet of the chamber for storing lubricant; and
   an electrochemical cell in the gas compartment for generating gas when the cell is connected to the source of electric current, the gas flowing into the gas compartment and against the separator to move the separator against the lubricant in the chamber to force the lubricant out through the outlet.

7. The conveyor system of claim 6 wherein:

the guide track and the lubricator are mounted on a support frame.

8. A conveyor system comprising:

a guide track including a pair of spaced apart guide rails, each guide rail having a guide surface and an aperture;

a conveyor chain supported by the guide rails for movement relative to the guide track, the conveyor chain including a plurality of interconnected links, a lower surface of at least one link contacting the guide surfaces of the guide rails when the conveyor chain is moved by a drive means; and a lubricator associated with each guide rail, each lubricator including a chamber for storing a lubricant and means for forcing lubricant from the chamber through an outlet in the chamber, the outlet of the chamber of each lubricator being in fluid communication with the aperture in its associated guide rail, the means for forcing lubricant from the chamber in each lubricator continuously forcing lubricant from the chamber and through the aperture in its associated guide rail when the means for forcing lubricant from the chamber is connected to a source of electric current contained within the lubricator, the outlet of the lubricator and the aperture in the guide track being connected in fluid communication by a conduit and an adapter block, the conduit being connected to the outlet of the lubricator and a port in the adapter block, said port being oblong and presenting a single stream of outwardly flowing lubricant, and said port having a longitudinal axis transverse to the direction of said movement of said chain, the adapter block being connected to the aperture in the guide track, the adapter block having a projection dimensioned to fit into the aperture in the guide track and having a passageway extending from the port to an opening in the projection whereby lubricant is forced from the chamber through the conduit and out of the opening in the projection in the adapter block, whereby a lubricating film is continuously formed between the guide surfaces of the guide rails and the lower surface of each link that contacts the guide surfaces of the guide rails when the means for forcing lubricant from the chamber in each lubricator is connected to the source of electric current.

9. The conveyor system of claim 8 wherein:

the aperture in each guide rail is an oblong aperture having its elongated dimension arranged substantially transverse to a direction of movement of the chain and the projection of each adapter block fits snugly in its associated aperture.

10. The conveyor system of claim 9 wherein:

the aperture in each guide rail extends from a first location adjacent a first edge of the guide rail to a second location adjacent an opposed second edge of the guide rail.

11. The conveyor system of claim 10 wherein:

the projection of each adapter block has an upper flat surface that is flush with its associated guide surface.

12. The conveyor system of claim 11 wherein:

the means for forcing lubricant from the chamber comprises
   a separator dividing the lubricator into the chamber for storing lubricant and a gas compartment, the separator being movably mounted in the lubricator spaced from and movable towards the outlet of the chamber for storing lubricant; and
   an electrochemical cell in the gas compartment for generating gas when the cell is connected to the source of electric current, the gas flowing into the gas compartment and against the separator to move the separator against the lubricant in the chamber to force the lubricant out through the outlet.

13. The conveyor system of claim 12 wherein:

the guide track and the lubricator are mounted on a support frame.

14. A conveyor system comprising:

a guide track having a guide surface and an aperture;

a conveyor chain supported by the guide track for movement relative to the guide track, the conveyor chain including a plurality of interconnected links, a lower surface of at least one link contacting the guide surface of the guide track when the conveyor chain is moved by a drive means; and a lubricator including a chamber for storing a lubricant and means for forcing lubricant from the chamber through an outlet in the chamber, the outlet of the chamber being in fluid communication with the aperture in the guide track, the means for forcing lubricant from the chamber continuously forcing lubricant from the chamber and through the aperture in the guide track when the means for forcing lubricant from the chamber is connected to a source of electric current contained within the lubricator, the outlet of the lubricator and the aperture in the guide track being connected in fluid communication by a conduit and an adapter block, the conduit being connected to the outlet of the lubricator and a port in the adapter block, said port being oblong and presenting a single stream of outwardly flowing lubricant, and said port having a longitudinal axis transverse to the direction of said movement of said chain, the adapter block being connected to the aperture in the guide track, the adapter block having a projection dimensioned to fit into the aperture in the guide track and having a passageway extending from the port to an opening in the projection whereby lubricant is forced from the chamber through the conduit and out of the opening in the projection in the adapter block, whereby a lubricating film is continuously formed between the guide surface of the guide track and the lower surface of each link that contacts the guide surface of the guide track when the means for forcing lubricant from the chamber is connected to the source of electric current, the guide track having a bottom wall and opposed sidewalls extending upward from the bottom wall, the bottom wall including the guide surface and the aperture, the aperture in the bottom wall of the guide track being an oblong aperture having its elongated dimension arranged substantially transverse to a direction of movement of the chain and the projection of the adapter block fitting snugly in the aperture, the aperture in the bottom wall of the guide track extending from a first location adjacent one of the opposed sidewalls of the guide track to a second location adjacent the other opposed sidewall of the guide track, the projection of the adapter block having an upper flat surface that is flush with the guide surface, the means for forcing lubricant from the chamber comprises:
  a separator dividing the lubricator into the chamber for storing lubricant and a gas compartment, the separator being movably mounted in the lubricator spaced from and movable towards the outlet of the chamber for storing lubricant; and
  an electrochemical cell in the gas compartment for generating gas when the cell is connected to the source of electric current, the gas flowing into the gas compartment and against the separator to move the separator against the lubricant in the chamber to force the lubricant out through the outlet; and the guide track and the lubricator being mounted on a support frame.

\* \* \* \* \*